United States Patent
Griepentrog

(10) Patent No.: US 6,614,482 B1
(45) Date of Patent: Sep. 2, 2003

(54) VIDEO OUTPUT STAGE WITH SELF-REGULATING BEAM CURRENT LIMITING

(75) Inventor: Dal Frank Griepentrog, Indianapolis, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/380,445

(22) PCT Filed: Dec. 15, 1997

(86) PCT No.: PCT/US97/22843

§ 371 (c)(1),
(2), (4) Date: Nov. 24, 1999

(87) PCT Pub. No.: WO98/39924

PCT Pub. Date: Sep. 11, 1998

(30) Foreign Application Priority Data

Mar. 5, 1997 (GB) .............................................. 9704536

(51) Int. Cl.⁷ .............................. H04N 5/68; H04N 9/73
(52) U.S. Cl. ..................... 348/380; 348/65.7; 348/810; 315/382.1
(58) Field of Search ................................. 348/380, 381, 348/382, 656, 657, 805, 810; 315/380, 381, 382, 383, 384, 386, 388, 382.1; H04N 5/68, 9/73

(56) References Cited

U.S. PATENT DOCUMENTS

| 4,207,591 A | * | 6/1980 | Parker ......................... 348/692 |
| 4,263,622 A | * | 4/1981 | Hinn |
| 4,277,798 A | * | 7/1981 | Hinn |
| 4,599,642 A | | 7/1986 | Willis |
| 5,134,490 A | * | 7/1992 | Neal ........................... 348/687 |
| 5,313,294 A | * | 5/1994 | Haferl ......................... 348/380 |
| 5,335,024 A | | 8/1994 | Rodriguez-Cavazos et al. |
| 5,714,842 A | * | 2/1998 | Krause et al. .............. 315/381 |
| 5,835,161 A | * | 11/1998 | Keller ......................... 348/674 |

FOREIGN PATENT DOCUMENTS

| EP | 680226 | 11/1995 | ............ H04N/9/69 |
| EP | 688136 | 12/1995 | ............ H04N/9/72 |

* cited by examiner

Primary Examiner—John Miller
Assistant Examiner—Brian Yenke
(74) Attorney, Agent, or Firm—Joseph S. Tripoli; Joseph J. Laks; William A. Lagoni

(57) ABSTRACT

A video processing system includes a video output driver stage which is capable of automatically self-regulating the peak beam current output provided to a display. The system includes a video output driver stage with a video signal input and a video signal output for providing an amplified video signal. The video output driver stage comprises means for amplifying the video signal input to form the video signal output and conveying the amplified video signal output to the image reproducing display device. The system further comprising a sensing output for providing thereat a sensed signal representative of current conducted by said image reproducing display device. The system also includes a sensing and control means for sensing the sensed signal and for providing a feedback signal to an input component of the video output driver stage for limiting the current conducted by said image reproducing display device to a predetermined value.

7 Claims, 5 Drawing Sheets

US 6,614,482 B1

VIDEO OUTPUT STAGE WITH SELF-REGULATING BEAM CURRENT LIMITING

This invention relates to a video processing system including a video output amplifier for providing video drive signals to an image display device such as a kinescope. In particular, this invention concerns a video output driver amplifier which can automatically self-regulate the peak beam current output provided to a display.

In a typical video processing system, video output amplifiers are used to provide amplified video signals to intensity control electrodes (e.g., cathodes) of a display device (e.g., kinescope). The amplified video signals are provided in the form of, for example, R, G, and B beam currents to the respective cathode of an image display device.

It is desirable to be able to limit the beam current provided to the display at a predetermined level. One reason is that if an excessive output beam current is developed in response to a large amplitude video signal representative of highly saturated color image information or peak white image information at the input of the video amplifiers, the output transistors of the amplifiers may saturate in response thereof.

A saturated output amplifier can produce an objectionable white or colored image smear following a displayed image area produced by a large amplitude video drive signal. For example, if a white image area is displayed and the biasing of the red video output transistor is such that the red output transistor saturates, a red color smear following the white image is likely to be produced as a result of the red video output transistor exhibiting a saturated conductive state together with the slow "recovery time" of the red output transistor due to transistor charge storage effects.

In addition to causing a receiver to produce a degraded image, excessive beam current may also cause degradation of the performance of the receiver's deflection system, electron beam spot defocusing and picture blooming. Such a high beam current may also exceed the safe operating capability of the kinescope, possibly causing damage to the kinescope and associated circuit components.

On the other Hand, it is desirable to be able to provide the maximum current allowable to the kinescope so that the picture produced by the display can be as bright and have as much contrast as possible. This is particularly desirable in a projection-type display where the pictures on the projection display tend to be dimmer than those on a direct view tube.

Various beam current limiting systems are known. One common approach to limiting beam current to a CRT is shown in FIG. 1. This approach involves monitoring the average beam current at the high voltage supply of a CRT 101 and providing a control signal representative of the magnitude of the average beam current. The average beam current is derived from a filtering capacitor C1. If the average beam current exceeds a predetermined threshold, then the parameters of the contrast and brightness adjustment stages 104A and 104B in the video processing circuit 104 are changed in accordance to the control signal. By reducing the contrast and brightness of the video signal at the input of the video driver stage, the beam current at the output of the video driver amplifier (20', 22', 24') is also reduced. The beam current is therefore controlled via the contrast and brightness processing stages of the video processing system, long before the video signal reaches the video driver stage.

EP 0 680 226 A2 discloses a kinescope driver apparatus having a gamma correction feature. Gamma correction is desirable to compensate for the non-linear relationship between the input signal and the light output of a picture tube. The apparatus comprises buffer amplifier 70 coupled to cathode K1 via resistor 79, which senses the cathode current. Buffer amplifier 70 is coupled to linear amplifier 60 via network 80. The feedback signal provided by network 80 provides gamma correction as shown in FIG. 1. However, the apparatus does not provide a peak beam limiting feature which limits the output to the cathode to a predetermined level when the cathode current exceeds a predetermined peak cathode current level.

U.S. Pat. No. 4,599,642 discloses a video signal processor that selectively couples a beam current control signal to a luminance processor and a chrominance processor during white level drive control intervals and black level bias control intervals. The processor includes a beam limiter control circuit that receives a summed signal representative of a combination of cathode currents and provides a control signal to the luminance and chrominance processors. Here, the apparatus uses a combined cathode current signal to generate the control signal and provides the control signal to various processors, rather than to a particular drive amplifier associated with a selected cathode.

The present inventor recognizes that, however, it is important to monitor and control not only the average beam current but also the peak beam current. Excessive average beam current and peak beam current can cause different problems mentioned above. An average beam current limiter is needed particularly to protect the high voltage supply system from excessive power drain, and the display from excessive power dissipation. Excessive average beam current may also result in shadow mask beam location error, therefore causing color error, in direct view tubes with a shadow mask.

A peak beam current limiter, on the other hand, is needed to prevent excessive instantaneous beam current that may cause excessive aging of the phosphor screen and poor spot size. Poor or large spot size is equivalent to poor focus and loss of resolution.

Furthermore, it is desirable to have both types of beam current limiters in the same video processing system because the relationship between peak and average level of a video signal cannot be predicted. For example, white characters in a black background can result in very high instantaneous peak beam current, yet low average beam current, if a television set is a high performance set, with significant drive capability or gain.

In accordance with the present invention, a video signal processing system including an image reproducing device for displaying video information in response to a video signal applied thereto is provided. The processing system includes an apparatus comprising a video output driver stage with a video signal input and a video signal output for providing an amplified video signal. The apparatus is characterized in that the video output driver stage comprises means for amplifying the input video signal and coupling said output signal to the image reproducing device. The output driver also includes a sensing output for providing thereat a sensed signal representative of current conducted by the image reproducing display device. The video driver stage further comprises measurement and control means for sensing the sensed signal and for providing a feedback signal to an input component of said video output driver stage for limiting the peak beam current conducted by said image reproducing display device to a predetermined value.

Figure 1:
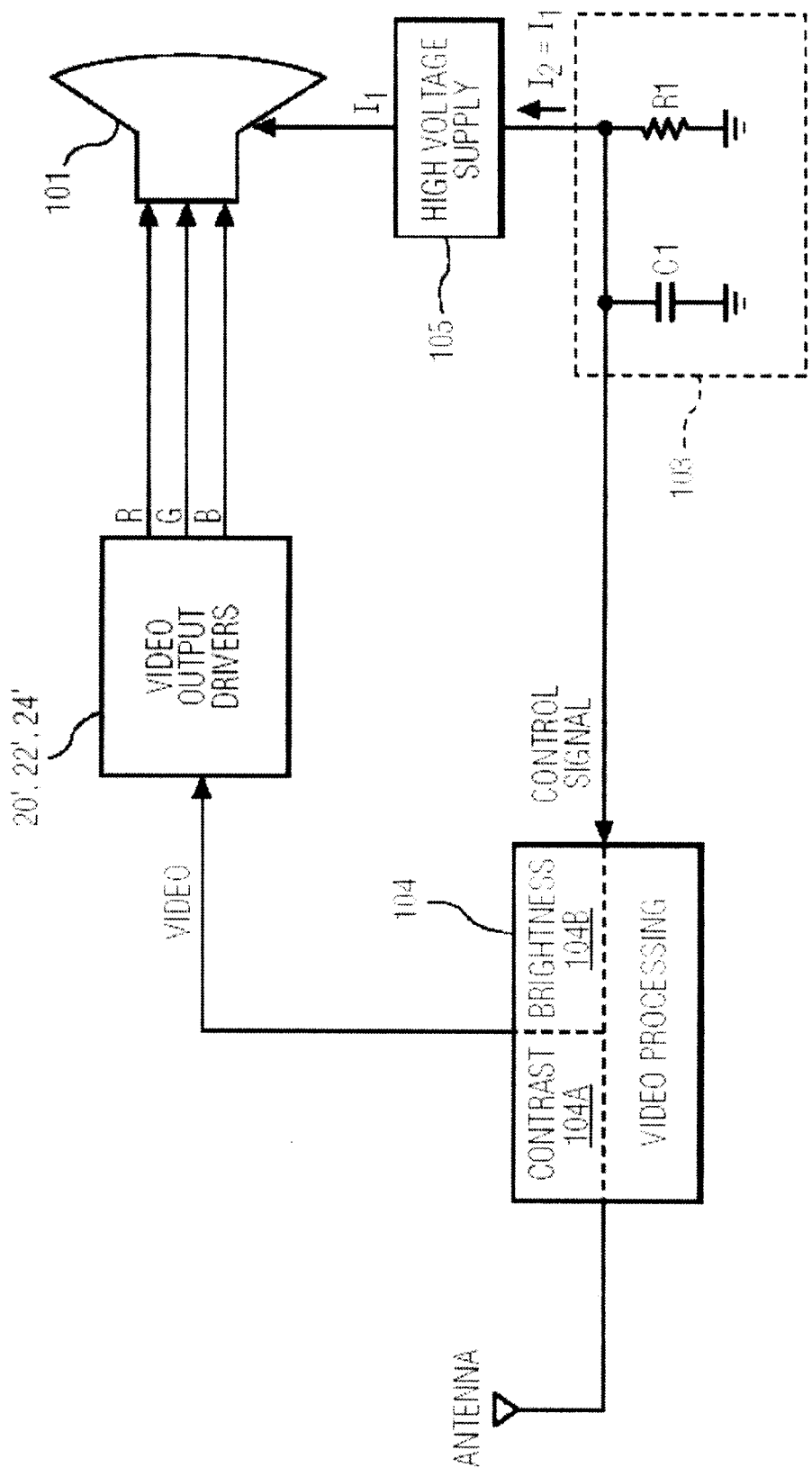
FIG. 1 shows a block diagram of a known approach to limit excessive average beam current.
Figure 2:
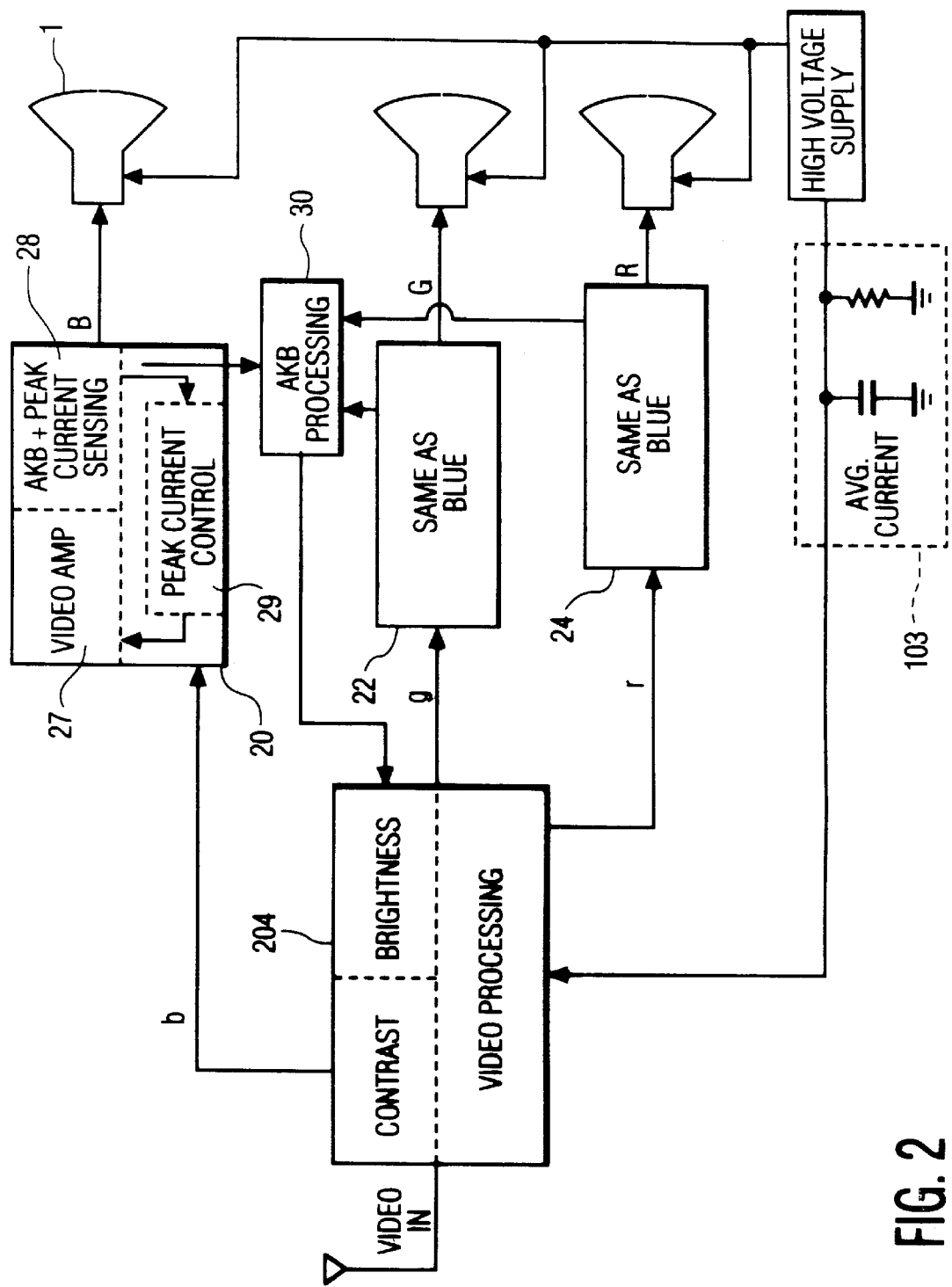
FIG. 2 shows a block diagram of an exemplary embodiment of a video processing system utilizing the present invention.

FIG. 2 is an example of a block diagram of a video processing system according to the principles of the present invention. The video processing system includes a typical video processing subsystem 204 comprising luminance and chromanance processing sections for processing an input video signal. The video processing system also employs a known average beam current limiting system including an average beam current sensing and feedback circuit 103 as described above, and as shown in FIG. 1. The video processing system further comprises video driver circuits 20, 22, and 24 for respective blue, green and red video signals. Each video driver circuit (e.g., 20) comprises an amplifier circuit 27 for amplifying the respective video signal, a sensing circuit 28 for measuring the AKB and the peak beam current, and a control circuit 29 for comparing the peak beam current to a predetermine threshold and for limiting the peak beam current to the threshold. The beam current sensed by the sensing circuit 28 is also provided to an AKB processing system 30.

The AKB processing system 30 is a known system for automatically establishing the proper black image representative current levels for each electron gun of a kinescope. As a result of this operation, the reproduced picture is prevented from being adversely affected by variations of kinescope bias from a desired level (e.g., due to aging and temperature effects). An AKB system typically operates during image retrace blanking intervals, at which time the kinescope conducts a small black level representative blanking current. This current is monitored by the AKB system 30 to generate a correction voltage representing the difference between the sensed black current level and a desired black current level. The correction voltage is applied to video signal processing circuits 204 preceding the kinescope with a sense for reducing the difference. AKB systems are disclosed, for example, in U.S. Pat. Nos. 4,263,622, and 4,277,798, both issued to Werner Hinn.

The video driver output stage 20, as shown in FIG. 2 in block diagram form will now be described in detail, with exemplary circuit components shown in FIG. 3.

Figure 3:
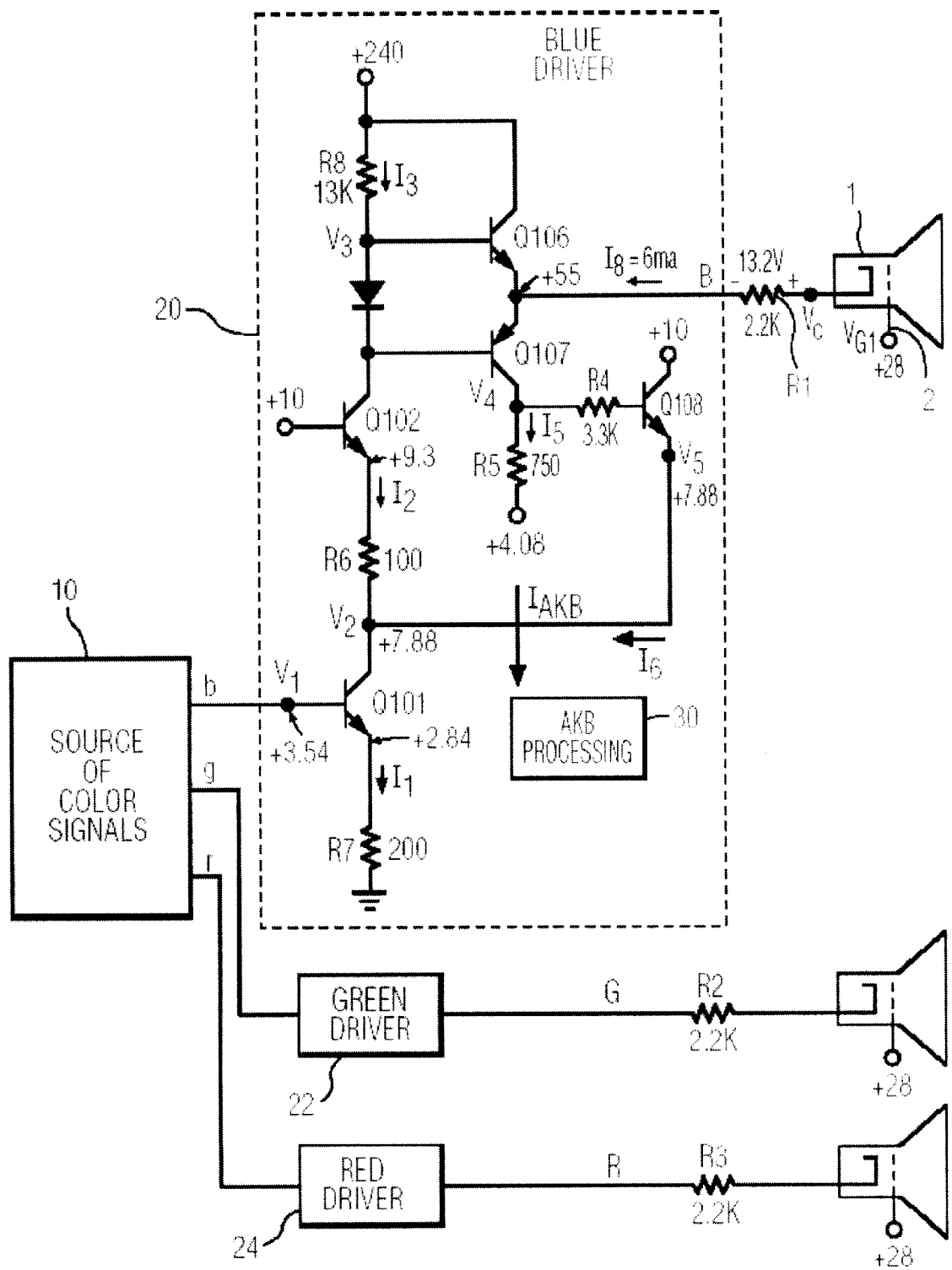
FIG. 3 shows a video processing system including exemplary circuit components of the output video driver according to the present invention.

FIG. 3 shows a source of color image representative video signals 10 providing low level color signals blue (b), green (g) and red (r), to respective b, g, and r color signal driver amplifier stages 20, 22 and 24 of similar configuration. The source of color signals 10, for example, may be from the video processing stage 204 of a television as shown in FIG. 2.

The structure and operation of blue (b) color signal driver amplifier 20, as will be discussed, also applies to red and green signal driver stages 22 and 24. High level output color video signals R, G, B from drivers 20, 22, and 24 are coupled via respective flash-over protection resistors R1, R2 and R3 of a color image reproducing kinescope 1. The flash-over protection resistors protect the drive circuitry from the harm of a kine arc occurring. A kinescope control grid 2 is biased by a high voltage source (not shown in FIG. 3), in common with respect to each of the cathode electrodes and forms a plurality of kinescope electron guns therewith.

Blue driver 20 comprises an input component, Q101, which is a common emitter amplifier transistor arranged in a cascode driver amplifier configuration with an output common base amplifier transistor Q102. Input blue (b) color signal is coupled to the base input electrode of the transistor Q101. A bias of approximately 10 volts is applied to the base of transistor Q102.

The output signal at the collector of Q102 serves as the input to a push-pull output stage comprising a NPN transistor Q106 and a PNP transistor Q107. Video output drive signal B is provided from both the emitter terminals of transistors Q106 and Q107, and is coupled to the blue cathode terminal of the kinescope 1 as described above to provide drive current for the kinescope 1.

In addition, the base conductor of a beam current measuring and controlling transistor Q108 is coupled to the collector terminal of Q107 through a base resistor R4. The collector of Q108 is connected to a bias voltage of approximately 10 V. The emitter of Q108 is fed back to the collector of lower cascode transistor Q101.

A resistor R5 is connected to the collector terminal of the transistor Q107 to provide a sensed current to the AKB processing system 30, as discussed previously in connection with FIG. 2.

The components in the exemplary embodiment of the present invention as shown in FIG. 3 have been chosen so that the maximum output beam current allowed is set at the threshold of 6 ma (i.e., IB=6 ma maximum). This exemplary value is selected based on a rating of the kinescope for this particular implementation, so as to prevent the various problems due to high peak beam current as discussed above. Other threshold values may be selected according to other implementation requirements and the teaching of the present invention as discussed below.

Once a maximum value is chosen, the value of the components in the circuit can be derived so the beam current will not exceed this selected value in accordance to the principles of the present invention. A known, empirical equation that is used to calculate beam current is shown below:

$$IB = 2.065 \times 10-6 \times (V\text{cut-off} + VG1 - V \text{ cathode})2.97 \text{ ma} \quad \text{(Equation 1)}$$

Having chosen IB, Vcut-off and VGRID are also chosen based on the rating of the particular CRT used. In the exemplary embodiment of FIG. 2, Vcut-off is rated at 190 V (measured from cathode to grid), and VG1 is biased at 28 V. Thus, the only unknown is Vcathode which can be solved from Equation 1:

$$V\text{cathode} = 68 \text{ V when } IB \text{ is at 6 ma.} \quad \text{(from Equation 1)}$$

Looking at the operation of the circuit in FIG. 2, it can be seen that I5 is a good approximation of the beam current IB. Current I5 flows through resistor R5 and produces an output voltage V4 which is in proportion to the beam current IB. This voltage is then monitored by Q108. Q108 then provides a feedback to the collector terminal of the input component, the lower cascode transistor Q101.

Therefore, it can be seen from FIG. 3 that when IB is at the 6 ma threshold value, the magnitude V1 at the input of the driver stage will be at about 3.54 volt. The value of V1 can be calculated by the following steps (assuming the voltage drop across the base and emitter of a transistor is 0.7 V):

$$V4 = 4.08 + (I5 \times R5) = 4.08 + 750 \times 6 \times 10-3 = 8.58 \text{ V}$$

$$V5 = V4 - 0.7 = 7.88 \text{ V}$$

$V2=V5$ $I2=(10-0.7-7.88)/100=14.2$ ma $I1=I2$ $V1=I1\times 200+0.7=3.54$ v

Thus, when V1 is below 3.54 V, the circuit will provide a beam current drive output which is non-clipped and is below the 6 ma threshold. That is, Q108 continuously monitors the potential at V4 which is in proportion to IB. Q108, however, will not conduct when V1 is below 3.54 volt and IB is less than 6 ma.

On the other hand, if the input signal V1 reaches 3.54 V or above, Q108 starts to conduct. This provides a feedback current I6 to the collector of Q101. This feedback raises the voltage potential at V2. This increase in V2 acts to compensate for the tendency of increasing I2 due to the higher input signal V1. This effect forces I2 to remain at 14.2 ma. Since I2 remains the same, IB will also be limited to the threshold of 6 ma, despite the increase in input signal V1.

Figure 4:
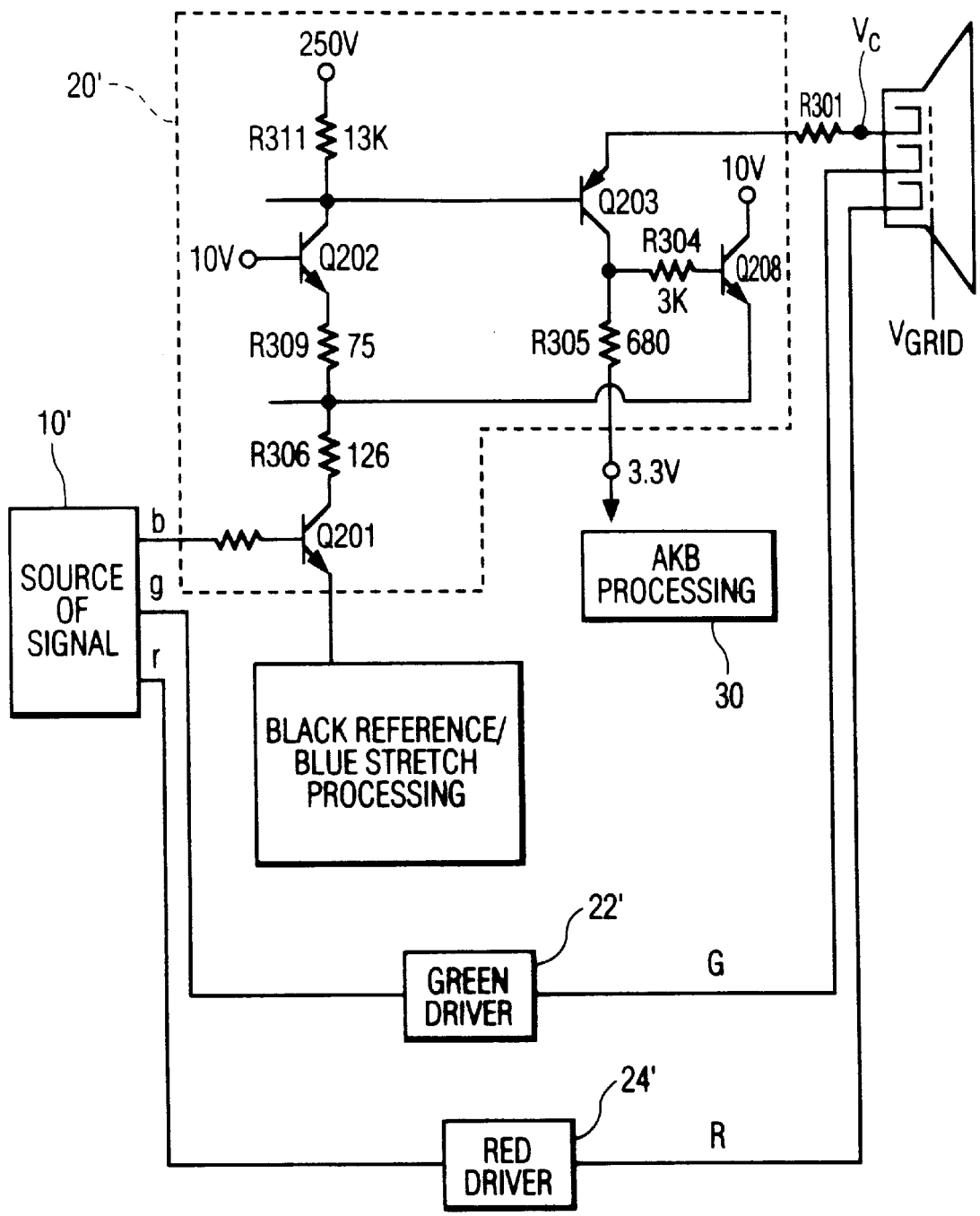
FIG. 4 shows another exemplary embodiment of a video processing system utilizing the present invention.

FIG. 4 shows another embodiment of the present invention. This embodiment is similar to that shown in FIG. 3. The embodiment in FIG. 4 shows variations in component values to account for different bias voltages and ratings used in this embodiment.

The operation of the embodiment shown in FIG. 4 is also similar to the above described operation of the embodiment in FIG. 3. Note that the sensing and control transistor Q208 now has its emitter connected directly to the emitter of the upper cascode transistor Q202. The output stage of the video driver 20 now consists of only emitter follower transistor Q203 in stead of a push-pull pair as shown in FIG. 3.

As shown in FIG. 4, the emitter follower transistor Q203 may be a PNP bipolar transistor.

Figure 5:
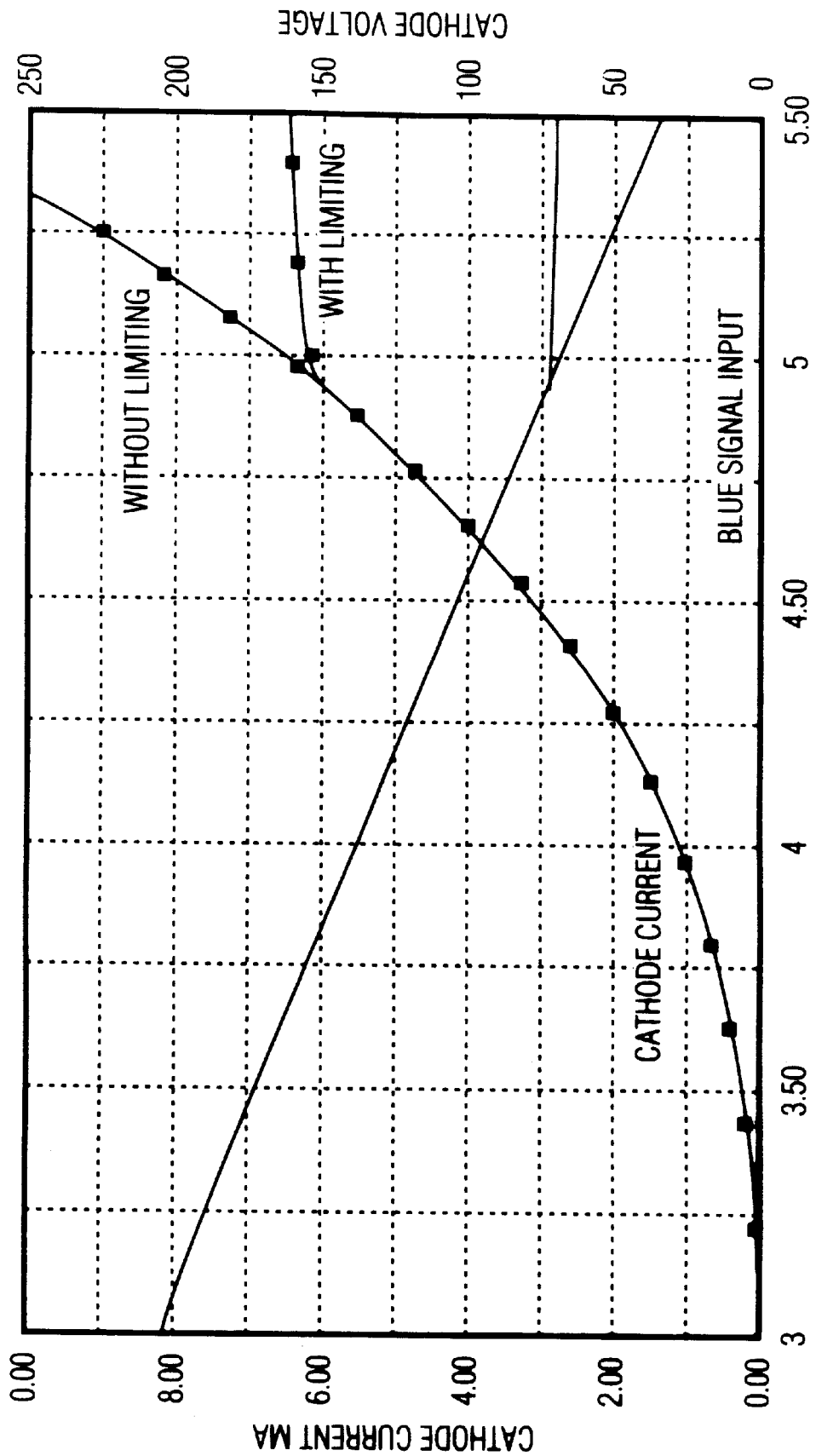
FIG. 5 is a graph showing a computer simulation of the exemplary circuit shown in FIG. 4.

FIG. 5 shows the results of a computer simulation of the circuit depicted in FIG. 4. The graph shows that with the addition of the peak current sensing and limiting circuits 28 and 29 in the output driver 20, the peak beam current is limited to approximately 6 ma as desired, even with increasing signal input.

It is to be understood that the embodiments and variations shown and described herein are for illustrations only and that various modifications may be implemented by those skilled in the art without departing from the scope and spirit of the invention.

What is claimed is:

1. A video signal processing apparatus, comprising:

a video signal input connected to a source of video signals for receiving a video input signal;

a video signal output connected to a selected cathode of an image reproducing device for providing an output signal, said selected cathode having a cathode current flowing therethrough in response to said output signal;

means, coupled between said video signal input and said video signal output, for amplifying said video input signal to form said output signal, said amplifying means including a driver amplifier;

means, coupled to said selected cathode, for sensing said cathode current, said sensing means providing a first signal representative of said cathode current flowing in said selected cathode; and means, directly coupled between said sensing means and said amplifying means, for providing a feedback signal to said driver amplifier, said feedback signal being responsive to said first signal, said feedback signal limiting an output from said driver amplifier to an output level, thereby limiting said output signal to a predetermined level when said cathode current exceeds a cathode current level, said drive amplifier comprising a common emitter amplifier transistor coupled in a cascode driver amplifier configuration with an output common base amplifier transistor, said cascode driver amplifier being coupled to an emitter follower amplifier, said emitter follower amplifier stage having an output coupled to said image reproducing device.

2. The apparatus of claim 1, wherein said feedback providing means comprises a bipolar transistor.

3. The apparatus of claim 2, wherein said bipolar transistor includes a base terminal coupled to said sensing means and an emitter terminal coupled to said amplifying means.

4. The apparatus of claim 1, wherein said emitter follower amplifier comprises a PNP transistor.

5. A video signal processing apparatus, comprising:

a video signal input connected to a source of video signals for receiving a video input signal;

a video signal output connected to a selected cathode of an image reproducing device for providing an output signal, said selected cathode having a cathode current flowing therethrough in response to said output signal;

means, coupled between said video signal input and said video signal output, for amplifying said video input signal to form said output signal, said amplifying means including a driver amplifier;

means, coupled to said selected cathode, for sensing said cathode current, said sensing means providing a first signal representative of said cathode current flowing in said selected cathode; and means, directly coupled between said sensing means and said amplifying means, for providing a feedback signal to said driver amplifier, said feedback signal being responsive only to said first signal, said feedback signal limiting an output from said driver amplifier to a predetermined level, thereby limiting said output signal to a predetermined level, when said cathode current exceeds a predetermined peak cathode current level, said drive amplifier comprising a common emitter amplifier transistor coupled in a cascode driver amplifier configuration with an output common base amplifier transistor, said cascode driver amplifier being coupled to a push-pull amplifier stage comprising an NPN transistor and a PNP transistor, said push-pull amplifier stage having an output coupled to said image reproducing device.

6. The apparatus of claim 5, wherein said feedback providing means is coupled to a collector of said PNP transistor.

7. The apparatus of claim 6, wherein said collector of said PNP transistor is coupled to an AKB processing unit.

* * * * *